J. R. SNYDER.
TRIPLE VALVE.
APPLICATION FILED FEB. 13, 1914.

1,198,076.

Patented Sept. 12, 1916.
2 SHEETS—SHEET 1.

WITNESSES

INVENTOR

J. R. SNYDER.
TRIPLE VALVE.
APPLICATION FILED FEB. 13, 1914.
1,198,076.
Patented Sept. 12, 1916.
2 SHEETS—SHEET 2.
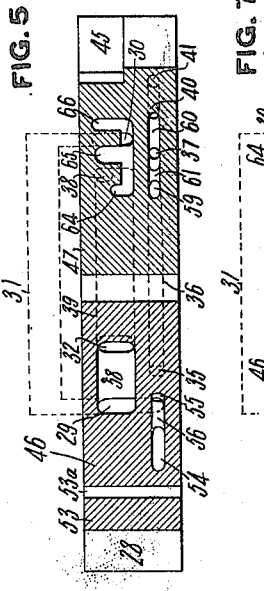
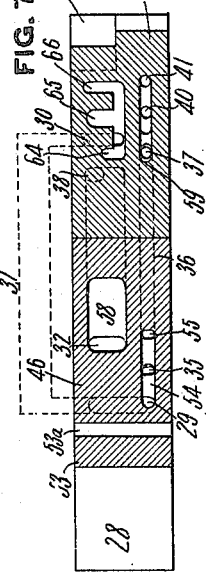
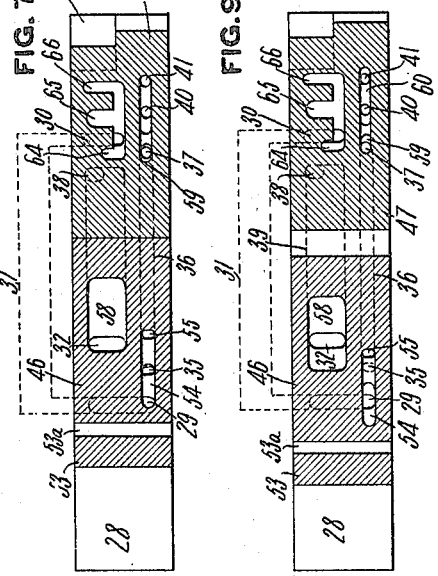
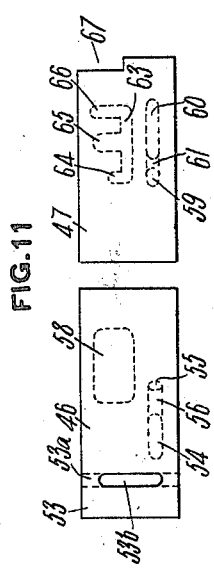
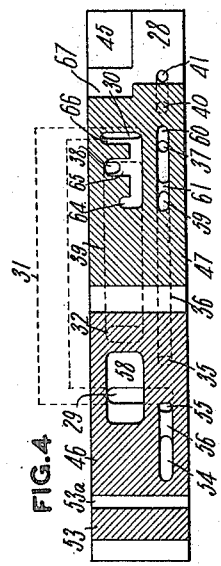
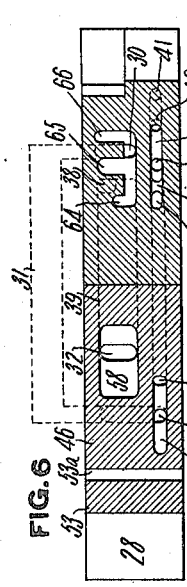
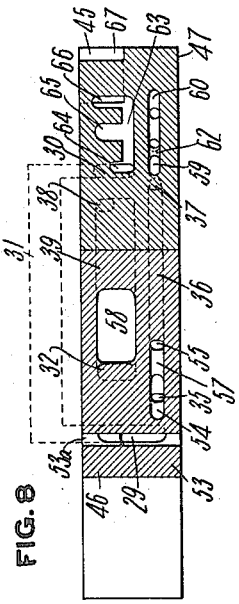
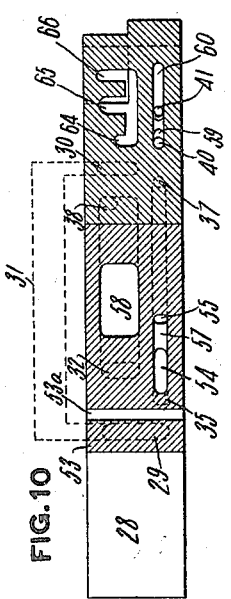
WITNESSES
INVENTOR

UNITED STATES PATENT OFFICE.

JACOB RUSH SNYDER, OF PITTSBURGH, PENNSYLVANIA, ASSIGNOR TO PITTSBURGH AIR BRAKE COMPANY, OF PITTSBURGH, PENNSYLVANIA, A CORPORATION OF PENNSYLVANIA.

TRIPLE VALVE.

1,198,076.  Specification of Letters Patent.  Patented Sept. 12, 1916.

Application filed February 13, 1914. Serial No. 818,570.

*To all whom it may concern:*

Be it known that I, JACOB RUSH SNYDER, a resident of Pittsburgh, in the county of Allegheny and State of Pennsylvania, have invented a new and useful Improvement in Triple Valves, of which the following is a specification.

This invention relates to triple valves for air brake systems, and more particularly to triple valves for use on freight trains. The valve is of that type which provides for a restricted recharge of the auxiliary reservoir, and retarded release of the brakes, and also for what is known as quick service position, that is, means for venting the train pipe locally at each car, so as to secure the quick serial action of the brakes throughout the train.

The present invention relates to the restricted recharge and retarded release feature, which are secured by a simpler arrangement of ports and mechanism than with prior valves having the same function; and also relates to the quick service feature, the parts being so arranged that the venting of the train pipe locally at the car and the movement of the valve to lap position can be effected with certainty for each one of a number of successive service reductions of train pipe pressure, and the train pipe is also locally vented twice on the initial service reduction of train pipe pressure, whereas in triple valves as heretofore constructed this local venting can be effected with certainty only upon the initial service reduction of train pipe pressure, and then only once.

The invention also provides an arrangement which gives a more pronounced venting effect that can be secured in prior valves of the same general type.

The invention comprises the construction and arrangement of parts hereinafter described and claimed.

Figure 1:
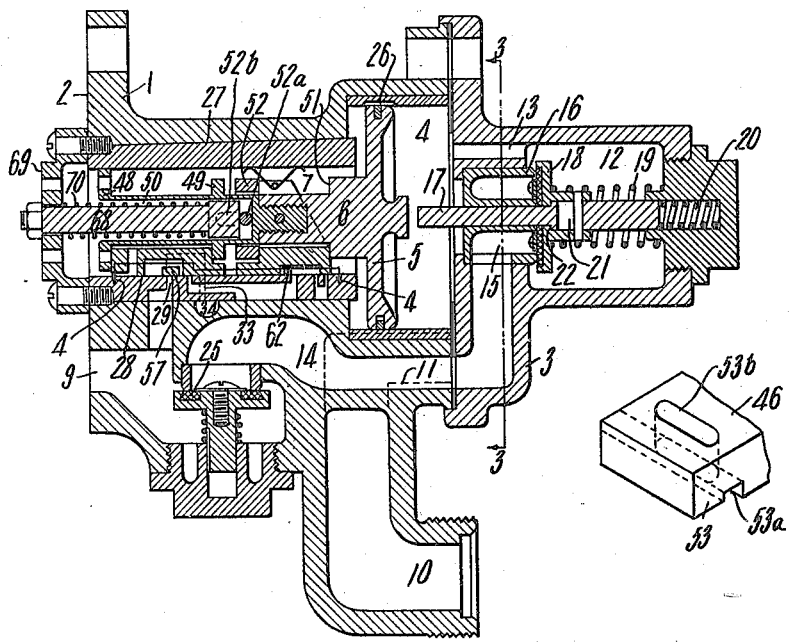
Figure 12:
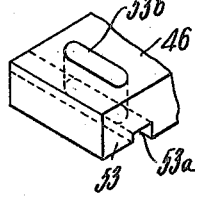
Figure 3:
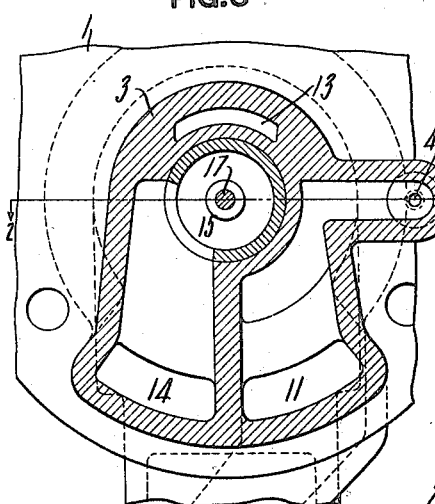
Figure 2:
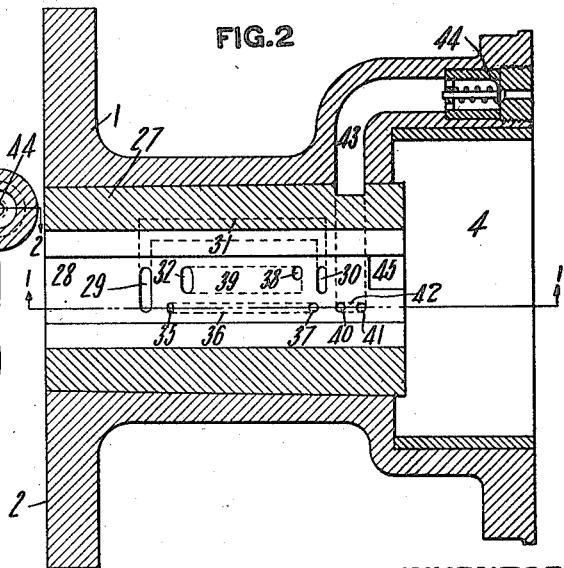

In the accompanying drawings Figure 1 is a longitudinal section through a triple valve embodying the invention, the section being taken on the line 1—1, Fig. 2, and showing the valve in full release and running position; Fig. 2 is a plan view of the valve seat on a horizontal section through the seat bushing, part being in section on the line 2—2, Fig. 3, and showing a check valve; Fig. 3 is a cross section through the valve, taken on the line 3—3, Fig. 1, looking in the direction of the arrows; Figs. 4, 5, 6, 7, 8, 9 and 10 are diagrammatic views illustrating the valve seat in plan and the slide valves in horizontal section on the line 4—4, Fig. 1, and showing the different positions of the valves, Fig. 4 showing the same in retarded release and restricted recharging position. Fig. 5 in full release and normal charging position, Fig. 6 in preliminary quick service position, Fig. 7 in secondary quick service position, Fig. 8 in full service position, Fig. 9 in service lap position, and Fig. 10 in emergency position; Fig. 11 shows plan views of the two slide valves; and Fig. 12 is a detail perspective view of a portion of one of said valves.

The valve in its general form, construction and arrangement follows the standard Westinghouse and similar valves. It comprises a casing 1 provided at one end with a flat face 2 for connection to the auxiliary reservoir and brake cylinder, if desired, and closed at its opposite end by the cap or head 3. In the casing is the usual chamber 4 in which works the piston 5, provided with a stem 6 projecting into the chamber or bore 7 of the casing and serving to actuate the slide valves. The auxiliary reservoir is connected directly to the end of chamber 7, while the brake cylinder connection is at 9. The train pipe connection 10 communicates through a passage 11 with the chamber 12 in the cap or head 3, from which chamber connection is had through opening 13 with the main piston chamber 4. The brake cylinder connection 9 communicates through passage 14 with an opening 15 surrounded by valve seat 16 surrounding the graduating stem 17. Coöperating with the seat 16 and controlling communication between the train pipe chamber 12 and the brake cylinder passage 14 is the emergency valve 18, which is normally held to its seat by a spring 19. The graduating stem 17 is normally held projected into piston chamber 4 by means of a light spring 20, and said stem is slidable through the emergency valve 18 and is provided with a pin and slot connection 21 thereto and with a shoulder 22 and has a certain amount of lost motion with reference to said valve, so that said stem may move outwardly a limited distance until the pin strikes the end of the slot without affecting said valve. Normally shoulder 22 on the graduating stem abuts a shoulder on the emergency valve, as shown in Fig. 1, and the spring 20 assists in holding said valve to its seat. In the brake cylinder passage 14 is a check valve 25, spring seated toward the train pipe.

The bushing of piston chamber 4 is provided with the usual feed groove 26. In the chamber or bore 7 is a bushing 27, whose lower portion forms a valve seat 28 which is provided with the following ports and passages to-wit:—An elongated transverse port 29 near the inner end of the seat and communicating directly with the brake cylinder connection 9; a shorter transverse port 30 near the outer end of the valve seat and lying wholly on one side of the center thereof, and communicating through a passage 31 with the port 29, thus providing two brake cylinder ports in all; a transverse port 32 longitudinally adjacent to the port 29 on one side of the center line of the valve and communicating through a passage 33 with the exhaust opening 34; a small port 38 longitudinally adjacent the port inwardly of the valve seat and communicating through a cored-out passage or groove 39 with the port 32 and exhaust opening 34; a small port 35, at one side of the valve seat and longitudinally adjacent the port 29 and communicating through a cored-out passage or groove 36 with a small port 37 near the outer end of the valve seat; two small ports marked respectively 40 and 41, which are connected by a cored-out passage or groove 42 and communicate with a cored-out passage 43 in the casing, which passage opens into the chamber 12 in the head or cap 3 and in which passage is a check valve 44 seating toward the train pipe chamber 12. At its outer end the upper face of the valve seat is provided with a rectangular cut-away portion 45.

Coöperating with the valve seat are a pair of slide valves 46 and 47, both substantially rectangular in shape. The slide valve 46 is located between collars 48 and 49 on the piston stem 6, which in the present valve is hollowed out to form an inner chamber 50. Said valve 46 completely fills the space between said collars so that it moves at all times with the main piston.

The valve 47 is located between a shoulder 51 on the piston stem and a collar 52 surrounding the stem and connected to the stem by a cross pin $52^a$ which travels in longitudinal slots $52^b$ in the walls of the hollow end portion of the stem. Collar 52 is movable longitudinally of the piston stem and its movement in one direction is limited by the collar 49 and in the other direction by the valve 47.

The inner end of the lower face of valve 46 is partly cut away so that it does not fully contact with the valve seat, thereby forming a throttling portion 53 separated from the main portion of the valve by a narrow transverse cavity $53^a$ extending completely across the valve from side to side and opening through the upper face of the valve, as at $53^b$. The valve is also provided, at one side of its center line with a longitudinally extending narrow cavity 54 and a small cavity 55 longitudinally in line with cavity 54 and connected thereto by a cored-out passage 56 above the bridge wall 57. Valve 46 is also provided in its lower face with a large rectangular cavity 58.

The valve 47 is provided in its lower face with a small port 59 and a longitudinally extending narrow cavity 60 which communicate with each other through a cored-out passage 61 above a transverse bridge wall 62. Said valve is also provided in its lower face with a longitudinal cavity 63 having three side extensions marked respectively 64, 65 and 66. The inner end corner of the valve 47 is also cut away, as at 67.

The chamber 50 within the hollow piston stem is provided to receive a yielding plunger 68 slidably mounted in a guiding yoke or cage 69 secured directly to the inner face of the casing 1. Said plunger is normally pressed toward the main piston chamber by a compression spring 70. Its inner end abuts the cross pin $52^a$ in full release and running position, as shown in Fig. 1, and when the main piston is forced fully over, or to the left in Fig. 1, the plunger recedes and the spring is compressed. This plunger and spring are for the purpose of returning the lost motion or graduating valve 47 outwardly from retarded release to full release position when the main piston and stem move outwardly as will be hereinafter described.

The valve described has seven positions, as follows:—

*1. Retarded release and restricted recharge position.* (Shown in Fig. 4).—This is the position assumed upon increase of train pipe pressure to release the brakes, which increase of train pipe pressure is so great that it cannot feed through the feed groove 26 with sufficient rapidity and as a consequence of which the piston 5 is moved entirely inwardly (to the left in Fig. 1), thereby compressing spring 70, and bringing the two slide valves to the position shown in Fig. 4. In this position of the valve extension 66 of the cavity 63 partly overlaps brake cylinder port 30 and extension 65 overlaps exhaust port 38, so that the brake cylinder is slowly exhausted to the atmosphere. Valve 47 has fully uncovered the small train pipe port 41, so that train pipe pressure gradually flows in on the auxiliary reservoir side of piston 5 and builds up the pressure on that side of the piston until it is sufficient together with the spring 70 to move the piston 5 outwardly to the next position to be described.

2. *Full release and normal charging position.* (Shown in Figs. 1 and 5.)—This position can be assumed by the valve either by admitting air so slowly into the train pipe that it will leak through the feed groove 26 sufficiently rapidly to prevent the triple valve from going to retarded release position, or this position is assumed by movement of the triple valve from retarded release position above described. When the piston 5 moves outwardly, as above described, it carries with it the slide valve 46 to establish communication through cavity 58 between brake cylinder port 29 and exhaust port 32. As cavity 58 and ports 29 and 32 are large, this results in a quick release of the brakes. At the same time the spring 70 and plunger 68, acting on the pin 52ª and collar 52, move the valve 47 outwardly to break connection between the brake cylinder port 30 and exhaust port 38. It will be further observed that in full release and normal charging position cavity 60 in the valve 47 partly overlaps port 40, and fully overlaps port 37 in the valve seat.

3. *Preliminary quick service position.* (Shown in Fig. 6.)—This is the position first assumed upon the initial service reduction of train pipe pressure in moving from full release position to full service position. In this position the piston moves outwardly without moving valve 47 until collar 49 abuts collar 52, when the small port 55 in valve 46 overlaps port 35 in the valve seat and port 54 of the valve 46 partially overlaps brake cylinder port 29. Consequently, air will flow from the train pipe through port 40, cavity 60, port 37, passage 36, ports 35 and 55, passage 56, and cavity 54, to brake cylinder port 29, thereby venting the train pipe at the car and securing an initial reduction of train pipe pressure at each car to insure the quick serial action of the brakes throughout the train. The reduction in train pipe pressure further unbalances the pressures on opposite sides of the main piston 5, and the valve almost immediately moves to the next position to be described.

4. *Secondary quick service position.* (Shown in Fig. 7.)—In this position the lost motion between the valve 47 and the position stem has been taken up and both valves moved outwardly to the position shown in Fig. 7. Cavity 60 in valve 47 overlaps both of the train pipe ports 40 and 41 in the valve seat, while cavity 59 overlaps port 37. Cavity 54 in the valve 46 fully overlaps port 35 and partially overlaps port 29 in the valve seat. Consequently train pipe pressure flows to the brake cylinder by way of ports 40 and 41, cavities 60 and 59, port 37, passage 36, port 35, cavity 54, and port 29, thereby producing a second vent from the train pipe to the brake cylinder at each car and securing an additional reduction of train pipe pressure to assist in securing quick serial action of the brakes throughout the train. In this position, and also in the preliminary quick service position before described, valves 46 and 47 cover both of the brake cylinder ports 29 and 30, so that there is no communication whatever between the reservoir and the brake cylinder, but the entire quick service braking is secured by air vented through the train pipe. Consequently, the train pipe ports 40 and 41 may be made larger than in prior valves, where the auxiliary reservoir is also vented to the brake cylinder in quick service position, thereby reducing the liability of the ports in the present valve clogging under service conditions. Furthermore, by venting only train pipe air to the brake cylinder in quick service position, a more pronounced local reduction in train pipe pressure is secured at each valve, and on a long train the valves are consequently more quickly responsive to small reductions in train pipe pressure. Also, on the initial service reduction of train pipe pressure, the train pipe is vented twice, once in the preliminary quick service position through port 40 and the second time in the secondary quick service position through either or both of the ports 40 and 41. The quick service feature is thereby secured on the initial reduction even if one or the other of these ports is choked. The outward movement of the valves is checked by the piston 5 abutting against the graduating stem 17, whereupon the resistance of the spring 20 is encountered, the outward movement of the valves being thereby checked until a further reduction of the train pipe pressure on the outer face of the piston 5 is brought about by the second venting of the train pipe, as above described. The pause at each of the two quick service positions is of appreciable time, sufficient to secure an appreciable and pronounced reduction in train pipe pressure at the car, and as soon as this reduction in train pipe pressure is effected in the secondary quick service position, the piston and valves almost immediately move to the position next to be described.

5. *Full service position.* (Shown in Fig. 8.)—The continued outward movement of the piston 5, as just described, compresses the spring 20 and continues until the cross pin in the emergency valve strikes the end of the slot, whereupon the resistance of spring 19 is encountered and the piston and valves come to rest in such position that the cavity 53ª in valve 46 overlaps the brake cylinder port 29 and the cavity 63 and lateral extension 64 partly overlap brake cylinder port 30. Extension 66 also partly overlaps the cut-away corner 45 in the valve seat. Consequently, air rushes from the reservoir to the brake cylinder by way of opening 53$^b$, cavity 53$^a$, and port 29, and through cut-away portion 67, cavity 63 and brake cylinder port 30 and applies the brakes as an ordinary service application. The length of time the valve remains in service position depends upon the amount of train pipe reduction, for as soon as the pressure on the inner face of piston 5, due to feeding the brake cylinder as described, drops so that it is nearly equal to train pipe pressure, the tension of the spring 20 acting on a graduated stem 17, moves the piston 5 and slide valves back to the next position, to wit:—

*6. Service lap position.* (Shown in Fig. 9, in which the slide valve 47 is moved inwardly to break connection between extension 66 of cavity 63 and the cut-away portion 45 in the valve seat, while the valve 46 is also moved inwardly to break connection between cavity 53 and brake cylinder port 29.)—Cavity 54 is moved beyond port 35 in the valve seat, and the latter is fully covered by the cross bridge 57 of valve 46, thereby breaking the venting connection from the train pipe to the brake cylinder. In the usual quick service triple valves two lap positions are provided, full service lap and quick service lap. Under some circumstances, as when the piston in the equalizing reservoir sticks, both valves on an initial service reduction jump clear over to full service position, moving so rapidly as to practically omit the quick service feature. When this occurs, the valves lap back only to full service lap position, and not to quick service lap position. Consequently, although the equalizing piston may move properly on the next service reduction, it is impossible to secure serial action of the brakes. In the present valve, both valves 46 and 47 are moved inwardly after the initial and each subsequent service reduction, the lost motion valve 47 being moved inwardly a lesser distance than the other valve, but nevertheless being moved inwardly sufficiently far so that its cavities 60 and 59 connect port 37 to the train pipe vent ports 40 and 41. The non-lost motion valve 46 moves back beyond the secondary quick service position, as above described. The valves move back to this same position from both secondary quick service and full service positions. Consequently, whenever train pipe pressure is again reduced after an initial reduction, the piston 5 moves outward and the first movement of the valve 46 causes its cavity 54 to connect vent port 35 with brake cylinder port 29, thereby again securing a quick service application of the brakes and a pronounced local reduction of train pipe pressure at the car, and thereby producing serial action of the brakes, and after train pipe pressure has been reduced sufficiently far, the valve continues its outward movement to full service position above described. On each service reduction in train pipe pressure after the initial reduction the valve produces but a single quick service or serial venting action. As a consequence of the construction described, the valve is capable of securing quick serial action of the brakes throughout the train upon the service reduction of train pipe pressure, whereas with prior types of triple valves the valves would only assume the quick service position with certainty upon the initial reduction of train pipe pressure. In order to insure the movement of both the main or lost motion valve 47, as well as the graduating or non-lost motion valve 46, back to service lap position, the graduating stem 17 projects farther than usual into the main piston chamber 4, as described, and the spring 20 is made comparatively long and light so that it becomes compressed when the valve mechanism moves to full service position, and its expansion is available to move the piston back sufficiently far to move the lost motion valve 47, as well as the non-lost motion valve 46. With the arrangement described, the valve is enabled to secure quick serial action of the brakes throughout the train, by each and every one of a series of successive service reductions of train pipe pressure.

*7. Emergency position.* (Shown in Fig. 10.)—This position is assumed upon a sudden material decrease in train pipe pressure from any cause, which causes the piston to move outward with such force that it not only compresses spring 20, but when the cross pin in the emergency valve is abutted by the end of the slot 21 in the graduating stem the spring 19 is also compressed. As a consequence the emergency valve 18 is kicked from its seat, and allows train pipe pressure to rush from chamber 12 through passage 14 to brake cylinder, unseating the check valve 25 in its course. This secures a sudden additional reduction of train pipe pressure at the car and insures the serial action of brakes throughout the train. As soon as brake cylinder pressure has been built up to equal that of the train pipe, check valve 25 closes. In this movement the slide valves have assumed the position shown in Fig. 10, in which brake cylinder port 29 is throttled by the throttling portion 53 of valve 46, allowing the large flow of air from the auxiliary reservoir to the brake cylinder, but which air cannot flow in too rapidly, and which added to the air coming from the train pipe, insures a strong and uniform application of the brakes. An emergency application can be brought about from any position of the triple valve, by making a sufficiently sudden reduction in train pipe pressure.

The valve described is of simple construction and secures all of the usual functions of modern freight triple valves, as well as providing for quick serial action of the brakes throughout the train upon each one of a number of successive service reductions in train pipe pressure. It also produces upon the initial service reduction in train pipe pressure two successive vents of air from the train pipe to the brake cylinder. The two slide valves, as shown, are arranged in tandem, and it is the outer slide valve, *i. e.*, the one nearest to the main piston, which is the lost motion valve.

What I claim is:—

1. A triple valve having connections to the train pipe, a brake cylinder, a reservoir, and the atmosphere, a movable abutment actuated by variations in train pipe pressure, and valve mechanism arranged to vent the train pipe to the brake cylinder through a restricted communication and through a large communication in successive positions of the valve mechanism in moving to full service position.

2. A triple valve having connections to the train pipe, a brake cylinder, a reservoir and the atmosphere, a movable abutment actuated by variations in train pipe pressure, and valve mechanism actuated by said movable abutment and arranged to twice vent the train pipe in moving from release to full service position, and when venting the train pipe having no communication from the reservoir to the brake cylinder.

3. A triple valve having connections to the train pipe, a brake cylinder, a reservoir and the atmosphere, a movable abutment actuated by variations in train pipe pressure, and valve mechanism actuated by said movable abutment and arranged to twice vent the train pipe to the brake cylinder in moving to full service position, and when venting the train pipe having no communication from the reservoir to the brake cylinder.

4. A triple valve having connections to the train pipe, a brake cylinder, a reservoir and the atmosphere, a movable abutment actuated by variations in train pipe pressure, and valve mechanism actuated by said movable abutment and arranged to twice vent the train pipe in moving to full service position before communication is established between the reservoir and brake cylinder.

5. A triple valve having connections to the train pipe, a brake cylinder, a reservoir, and the atmosphere, a movable abutment actuated by variations in train pipe pressure, and valve mechanism arranged to vent the train pipe to the brake cylinder through a restricted communication and through a large communication in successive positions in moving to full service position, and on each subsequent reduction to then vent the train pipe.

6. A triple valve having connections to the train pipe, a brake cylinder, a reservoir, and the atmosphere, a movable abutment actuated by variations in train pipe pressure, and valve mechanism actuated by said movable abutment and arranged on an initial reduction in train pipe pressure to twice vent the train pipe to the brake cylinder in positions in which there is no communication between the reservoir and brake cylinder, and upon subsequent service reductions in train pipe pressure to vent the train pipe to the brake cylinder in one of said positions.

7. A triple valve having connections to the train pipe, a brake cylinder, a reservoir, and the atmosphere, a movable abutment actuated by variations in train pipe pressure, and valve mechanism actuated by said movable abutment and arranged in moving from service lap position to full service position to vent the train pipe, and in moving from release to full service position to twice vent the train pipe to the brake cylinder, once through a restricted communication and once through a large communication.

8. A triple valve having connections to the train pipe, a brake cylinder, a reservoir and the atmosphere, a movable abutment actuated by variations in train pipe pressure, and valve mechanism actuated by said movable abutment and arranged in moving from service lap position to full service position to vent the train pipe to the brake cylinder in a position in which there is no communication between the reservoir and brake cylinder, and in moving from release to full service position to twice vent the train pipe in positions in which there is no communication between the reservoir and brake cylinder.

9. A triple valve having connections to the train pipe, a brake cylinder, a reservoir and the atmosphere, a movable abutment actuated by variations in train pipe pressure, valve mechanism actuated by said movable abutment and including a pair of tandem valves, the outer one of which has a lost motion connection with said movable abutment, means arranged on equalization of pressure after service reduction to move both of said valves toward release position, and ports and cavities so arranged that in moving from lap to service position the train pipe is connected to the brake cylinder.

10. A triple valve having connections to the train pipe, a brake cylinder, a reservoir and the atmosphere, a movable abutment actuated by variations in train pipe pressure, valve mechanism actuated by said movable abutment and including a pair of tandem valves, the outer one of which has a lost motion connection with said movable abutment, said valve mechanism being arranged to establish connections between the auxiliary reservoir and brake cylinder and the brake cylinder and the atmosphere, and having a normal open position for exhaust and another position for retarded release, said lost-motion valve controlling the retarded release of the brakes, and yielding means acting upon said lost-motion valve to move the same from retarded release position.

11. A triple valve having connections to the train pipe, a brake cylinder, a reservoir, and the atmosphere, a movable abutment actuated by variations in train pipe pressure, and valve mechanism arranged to vent the train pipe to the brake cylinder through a restricted opening in the main valve mechanism, then through a large opening in the main valve mechanism in moving to full service position, and in full service position to establish communication from the auxiliary reservoir to the brake cylinder.

12. A triple valve having connections to the train pipe, a brake cylinder, a reservoir, and the atmosphere, a movable abutment actuated by variations in train pipe pressure, and valve mechanism arranged to vent the train pipe to the brake cylinder through a restricted opening in the main valve device then through a large opening in the main valve device in moving to full service position, in full service position to establish communication from the auxiliary reservoir to the brake cylinder, and in emergency position to establish direct communication from the train pipe to the brake cylinder and open communication from the auxiliary reservoir to the brake cylinder through the main valve seat.

In testimony whereof, I have hereunto set my hand.

JACOB RUSH SNYDER.

Witnesses:
ELBERT L. HYDE,
GLENN H. LERESCHE.

Copies of this patent may be obtained for five cents each, by addressing the "Commissioner of Patents, Washington, D. C."